(12) United States Patent
Calvert

(10) Patent No.: US 6,526,275 B1
(45) Date of Patent: Feb. 25, 2003

(54) METHOD FOR INFORMING A USER OF A COMMUNICATION DEVICE WHERE TO OBTAIN A PRODUCT AND COMMUNICATION SYSTEM EMPLOYING SAME

(75) Inventor: Brian Edward Calvert, Austin, TX (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/556,385

(22) Filed: Apr. 24, 2000

(51) Int. Cl.$^7$ ................................................ H04M 3/00
(52) U.S. Cl. .................... 455/418; 455/456; 455/566; 455/435
(58) Field of Search ................................ 455/415, 414, 455/418, 406, 408, 426, 409, 456, 403, 412, 419, 422, 566, 557, 425, 435, 457; 379/113–142, 265; 707/4, 3, 10; 709/219, 236

(56) References Cited

U.S. PATENT DOCUMENTS

| | | | | |
|---|---|---|---|---|
| 4,757,267 A | * | 7/1988 | Riskin | 379/113 |
| 5,752,186 A | * | 5/1998 | Malackowski | 455/414 |
| 5,903,830 A | * | 5/1999 | Joao | 455/406 |
| 5,940,471 A | * | 8/1999 | Homayoun | 379/1 |
| 5,946,618 A | * | 8/1999 | Agre et al. | 455/428 |
| 6,091,956 A | * | 7/2000 | Hollenberg et al. | 455/456 |
| 6,131,028 A | * | 10/2000 | Whitington | 455/435 |
| 6,144,848 A | * | 11/2000 | Walsh | 455/419 |
| 6,151,492 A | * | 11/2000 | Melin | 455/414 |
| 6,226,367 B1 | * | 5/2001 | Smith | 379/142 |
| 6,377,986 B1 | * | 4/2002 | Philyaw et al. | 709/219 |

\* cited by examiner

Primary Examiner—Vivian Chin
Assistant Examiner—John J Lee
(74) Attorney, Agent, or Firm—Charles W. Bethards; Hisashi D. Watanabe

(57) ABSTRACT

A communication system (100) employs a method for informing a user of a communication device (e.g., 101) where to obtain a product. The communication system determines an approximate location of the communication device and whether a particular requested product or one or more other potentially desirable products are available in a general vicinity of the device. When the particular or potentially desirable product is so available, a context engine server (109) of the communication system conveys a product information request and optionally other purchaser-related information to multiple product providers (120). The context engine server receives responses to the product information request from at least some of the product providers, wherein at least some of the responses preferably include offers to pay respective advertising fees. The context engine server generates a list of product providers based on the responses and provides the list to the communication device for display to the device user.

23 Claims, 3 Drawing Sheets

METHOD FOR INFORMING A USER OF A COMMUNICATION DEVICE WHERE TO OBTAIN A PRODUCT AND COMMUNICATION SYSTEM EMPLOYING SAME

FIELD OF THE INVENTION

The present invention relates generally to communication systems and, in particular, to informing a user of a communication device operating in a communication system where to obtain a product that may be desired by the user.

BACKGROUND OF THE INVENTION

Wireless communication systems are well known and include various types of systems, such as cellular telephone systems, paging systems, two-way radio systems, personal communication systems, personal area networks, data systems, and various combinations thereof. Such wireless systems are known to include a system infrastructure and communication devices constructed and programmed to operate in the respective system. The system infrastructure includes fixed network equipment, such as base transceiver sites (BTSs), system controllers, switches, routers, communication links, antenna towers, and various other known infrastructure components. The communication devices include antenna systems, transmitters, receivers, processors, memory, user interfaces, and user controls.

Wireline communication systems are also well known and, similar to their wireless counterparts, include a system infrastructure and communication devices. Such systems include local area networks or wide area networks, such as the Internet. The system infrastructure includes switches, routers, communication links, servers, and various other known infrastructure components. The communication devices include transmitters, receivers, processors, memory, user interfaces, and user controls. A typical communication device is a personal computer connected to a wireline or cable modem.

Certain wireless systems include the capability, either inherently or specially, to locate communication devices within the systems with varying degrees of accuracy. For example, a cellular system inherently includes the capability to coarsely locate a registered cellular telephone either within a so-called paging location area (e.g., a group of cells or BTS coverage areas)—when the cellular telephone is not actively engaged in a communication—or within a cell or BTS coverage area—when the cellular telephone is actively engaged in a communication. A cellular system must be able to locate cellular telephones with the aforementioned accuracies to enable the telephones to properly receive and place telephone calls.

Other systems have been proposed to enable more accurate locating of wireless devices in the event of an emergency or simply for the purposes of continually monitoring the locations of the devices (e.g., in public safety systems). Such other systems either incorporate global positioning satellite (GPS) receivers in the wireless devices or use triangulation techniques to approximately locate the devices.

Location-determining in wireline systems is inherent. Since wireline users are not mobile (except possibly for the use of cordless phones, but even then the cordless base unit is fixed), they can only be at one location (i.e., near the fixed location of the device's access point to the system).

It is well known for product providers, or equivalently vendors, to use advertising in an attempt to increase the sales of their products. In wireline communication systems, such as the Internet, product providers use so-called "banner advertisements" that appear on the computer screen when certain web pages are opened. Banner advertisements, like other forms of advertising, attempt to create a desire in the viewer of the advertisement to purchase the advertised product or attempt to leave an impression with the viewer, such that when the viewer eventually desires to obtain the type of product advertised, the viewer will remember the advertisement and visit the provider to purchase the product. With the recent advent of Internet-accessible mobile telephones, such banner-type advertising, if not already, will soon be available to wireless users also. However, banner advertisements and other forms of advertising, such as television commercials, are directed at consumers in general and are not directed to the individual needs of consumers at the times such needs arise.

Although techniques for locating devices in wireline and wireless systems are known and approaches for advertising products generally to wireless and wireline users are also known, there are no communication systems that combine both location and advertising to provide consumers with product information as they need it based on their current location. Thus, consumers must rely on advertising they hear on the radio or see on television, in the newspaper, or as banner ads on the Internet to obtain information on products they may at some time need. However, such advertisements rarely address an immediate need of the consumer. Moreover, even if the advertisement or commercial addresses the consumer's immediate need, the advertisement may be useless to the consumer if the consumer is unfamiliar with the area and does not know whether the provider of the product is nearby or far away from the consumer's current location.

Therefore, a need exists for a method and communication system for informing a user of a communication device where to obtain a product, wherein such method and system provide product information (e.g., advertisements) to the user at the time the user needs or likely needs such information and wherein the product information relates to product providers that are located, or at least have distribution locations, near the current location of the user.

DETAILED DESCRIPTION OF A PREFERRED EMBODIMENT

Generally, the present invention encompasses a method for informing a user of a communication device where to obtain a product and a communication system employing such a method. As used herein and in the appended claims, the term "product" refers to any and all types of goods and/or services that may be provided to the user of the communication device. The communication system, either periodically on its own or responsive to a request for a particular product from the communication device, determines an approximate location of the communication device and whether the particular product (when so requested) or one or more other products (e.g., as automatically determined by the system as being potentially desirable to the device user) are available in a general vicinity of the communication device. When the particular product or some other product is so available, a context engine server of the communication system conveys (e.g., via the Internet) a product information request and optionally other information, such as the approximate location of the communication device and demographic information pertaining to the user of the communication device, to a plurality of product providers. The context engine server then receives (e.g., via the Internet) responses to the request from at least some of the product providers, wherein at least some of the responses may include offers to pay respective advertising fees. The context engine server generates a list of the product providers based on the offered advertising fees or, when no such fees have been offered, based on other ranking factors, such as the proximity of the product providers to the geographic location of the communication device, and provides the list to the communication device for display to the user.

By providing product information in this manner, the present invention enables users of the communication system to obtain availability and other information for products, such as goods and/or services, that the users may be interested in acquiring, while also providing a mechanism in which product providers can, in real-time, compete for the business of particular customers. Thus, the present invention preferably utilizes the Internet, with its ever-growing popularity, as the backbone network to enable product providers to make real-time competitive bids for product advertising directed at consumers that are, at the time of the advertising, either truly interested in the provider's products (e.g., when the communication device user has requested a particular type of product) or are likely to be interested in the provider's products. With the present invention, product advertising dollars can be efficiently spent by being used to advertise to consumers that, at the exact time of the advertising, either desire to obtain a product or, due to the location of the consumer and other conditions (e.g., time of day), are highly likely to be interested in obtaining a product.

Figure 1:
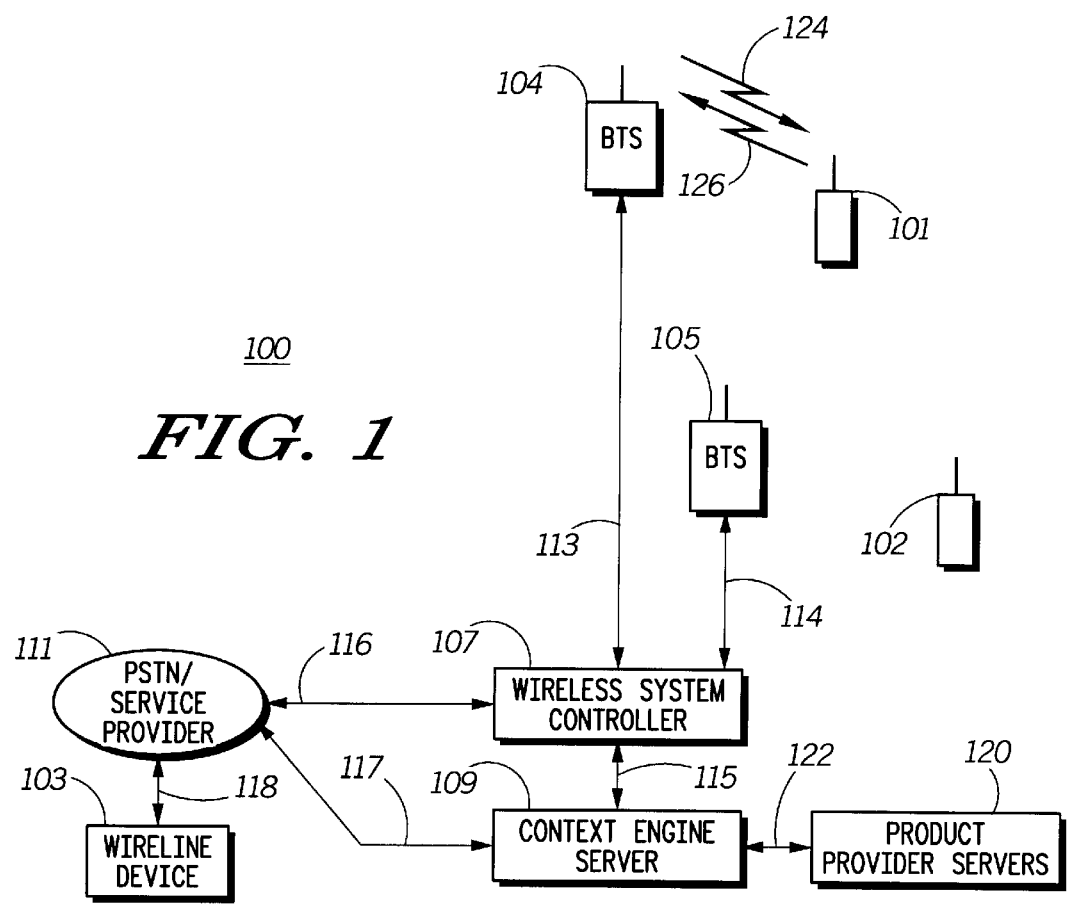
FIG. 1 is a block diagram of a communication system in accordance with the present invention.

The present invention can be more fully understood with reference to FIGS. 1–5, in which like reference numerals designate like items. FIG. 1 is a block diagram of a communication system 100 in accordance with the present invention. The communication system 100 includes a plurality of communication devices 101–103 (three shown, two of which are wireless devices 101, 102 and one of which is a wireline device 103) and a system infrastructure. The system infrastructure is coupled via one or more communication links 122 to a plurality of product provider servers 120. The system infrastructure may support wireless communications, wireline communications, or both types of communications. The system infrastructure for the system 100 depicted in FIG. 1 supports both wireless and wireline communications. Thus, the system infrastructure for the system 100 of FIG. 1 includes, inter alia, one or more base transceiver sites 104, 105 (two shown) providing communication services to the wireless communication devices 101, 102, a wireless system controller 107, a context engine server 109, a public switched telephone network (PSTN) and/or other appropriate Service Provider 111 providing communication services to the wireline communication devices 103, and a plurality of communication links 113–118 coupling the wireless system controller 107 to the base transceiver sites (BTSs) 104, 105, coupling the wireless system controller 107 to the PSTN/Service Provider 111 and the context engine server 109, coupling the wireline communication devices 103 to the PSTN/Service Provider 111, and coupling the PSTN/Service Provider 111 to the context engine server 109.

The wireless portion of communication system 100 might comprise a two-way radio system, a cellular telephone system, a cordless telephone system (e.g., a wireless local loop), a home wireless network, a personal communication system (PCS), a personal area network (e.g., a Bluetooth network), a wireless data system, a paging system, or any combination thereof. Accordingly, the wireless communication devices 101, 102 may comprise mobile or portable radios, radiotelephones, pagers, wireless data terminals (such as palmtop computers, personal digital assistants (PDAs), or laptop computers that include PCMCIA cards for wireless conununication), or any combination thereof. A preferred wireless communication device 200 is described in detail below with respect to FIG. 2.

Depending on the type of wireless subsystem in system 100, each BTS 104, 105 may comprise transmitters, receivers, control and storage equipment, and telephone interconnect equipment. The wireless system ontroller 107 comprises any known controller, such as a base site controller, paging system controller, a central controller, or a dispatch application processor, appropriate for controlling communications involving wireless communication devices 101, 102 operating in the particular system 100. Except for appropriate software modifications necessary to implement the present invention as described below, the components of each BTS 104, 105 and of the wireless system controller 107 are well known; thus no further discussion of them will be presented except to facilitate an understanding of the present invention.

The wireline components of the system infrastructure (e.g., PSTN equipment and/or Internet or Cable Service Provider Equipment) are generally well known; thus no further discussion of them will be presented. The wireline communication devices 103 may comprise telephones, computers, data terminals, PDAs, Internet servers, or other such devices.

Communication links 113–118 may comprise any known communication links, including, but not limited to, leased telephone lines, such as T1 or T3 lines, microwave links, integrated services digital network (ISDN) lines, digital subscriber lines (DSLs), community antenna television (CATV) cables, low speed (e.g., 56 kilobit per second) data links, RS-232 links, or a common hardware bus when the wireless system controller 107 is directly coupled to the BTSs 104, 105, the context engine server 109, and the PSTN/Service Provider 111. In the event that the wireless system controller 107 is not so directly coupled to one or more of such aforementioned infrastructure elements 104, 105, 109, 111, the communication links 113–118 may include other elements, such as switches or switching centers, routers, gateways, bridges, controllers, taps, or any other components used to interconnect systems or portions thereof. The context engine server 109 preferably comprises a processor and one or more databases. The size of the database and the power of the processor used to implement the context engine server 109 depend on the desired processing capabilities of the context engine server 109. For example, a higher power processor and a larger database are required when the context engine server 109 is intended to contain all the information for the product providers (e.g., store or service locations of the product providers, product provider hours of operation, product provider telephone numbers, and so forth) as compared to when the context engine server 109 is intended to contain only limited information for some or all of the product providers (e.g., general product categories and general geographic areas, such as city, state, or region of a country, in which the product providers engage in business). The context engine server 109 may be external to the wireless system controller 107 (as shown) or may reside within the wireless system controller 107. When located external to the system controller 107, the context engine server 109 is coupled to the system controller 107 via an appropriate communication link 115, such as an RS-232 link, an Ethernet link, an Internet connection, a common hardware bus, or any conventional means for interconnecting a wide area network (WAN) or a local area network (LAN).

Each BTS 104, 105 provides communication service to a respective service coverage area, conveying information to and receiving information from wireless communication devices 101, 102 over wireless communication resources 124, 126. Depending on the access scheme utilized in the wireless portion of the system 100, each communication resource 124,126 may comprise a frequency carrier, one or more time slots of a frequency carrier, or an orthogonal code implemented by a respective frequency hopping pattern or by a pseudo-random noise sequence spread over a wide (e.g., 3 MHz) bandwidth.

In order to permit communication with remote product provider servers 120 (e.g., servers on which product provider websites or web pages reside), the context engine server 109 is coupled to the product provider servers 120 via appropriate communication links 122, such as ordinary telephone lines, T1 or T3 leased lines, ISDN lines, DSL links, low speed data links, CATV cables, or any other data links.

Figure 2:
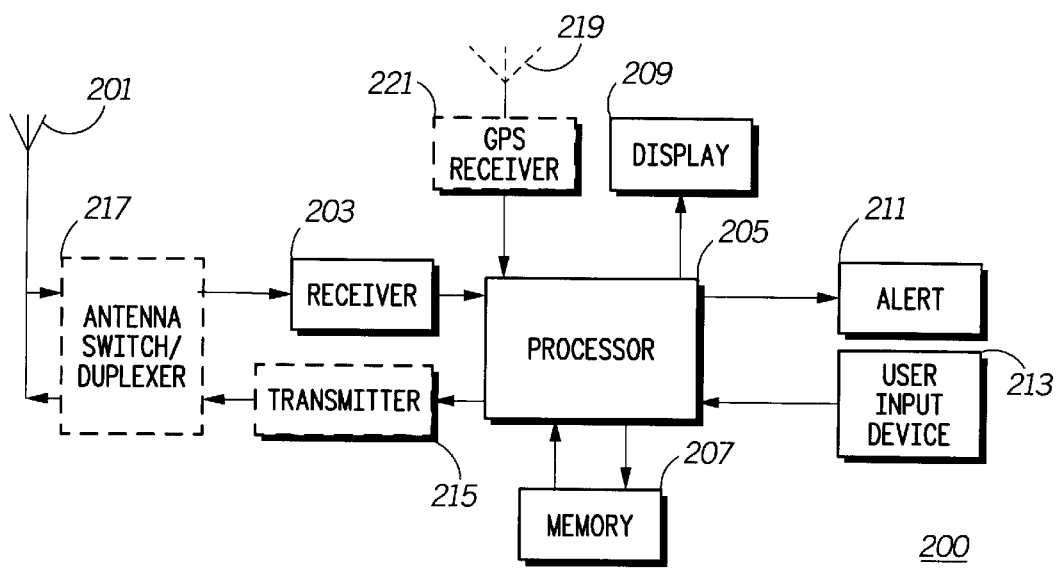
FIG. 2 is a block diagram of an exemplary communication device that operates in accordance with the present invention.

FIG. 2 is a block diagram of an exemplary wireless communication device 200 that operates in accordance with the present invention. The communication device 200 includes a receiver antenna 201, a receiver 203, a processor 205, memory 207, a display 209, an alerting device 211, and a user input device 213. When capable of two-way operation, the wireless communication device 200 further includes a transmitter 215 and may also include an antenna switch 217 or a duplexer 217 in the event that half-duplex or full-duplex operation, respectively, is desired. The communication device 200 may optionally include a GPS receiver 221 and an associated antenna 219 to assist in estimating the current location of the device 200.

The receiver antenna 201 is a conventional antenna capable of receiving signals transmitted from a BTS 104, 105. The receiver 203 is a conventional receiver for receiving a signal, via the duplexer/antenna switch 217 when so utilized, in accordance with a predetermined wireless communication protocol and for down-converting and demodulating the received signal to provide baseband information to the processor 205. The receiver 203 includes well-known components, such as filters, mixers, small-signal amplifiers, a demodulator, and other known elements necessary to receive, demodulate, and down-convert signals in accordance with the communication protocol utilized in the wireless portion of the system 100. The transmitter 215, when utilized, is also well-known and includes filters, mixers, a modulator, large-signal amplifiers, and other known elements to produce a radio frequency or microwave signal bearing information to be conveyed to the system infrastructure and/or to one or more communication devices 101, 102, 103 over a wireless resource or channel 126.

The processor 205 comprises one or more microprocessors and/or one or more digital signal processors. The memory 207 is coupled to the processor 207 and preferably comprises a read-only memory (ROM), a random-access memory (RAM), a programmable ROM (PROM), and/or an electrically erasable read-only memory (EEPROM). The memory 207 preferably includes multiple memory locations for storing, inter alia, (i) the computer programs executed by the processor 205, (ii) the address or addresses assigned to the wireless communication device 200, (iii) information received from the BTSs 104, 105 for later retrieval by a user of the communication device 200, such as a list of product providers in accordance with the present invention, and (iv) any other information received from the BTSs 104, 105, such as instructions for displaying the list of providers to the wireless device user. The computer programs are preferably stored in ROM or PROM and direct the processor 205 in controlling the operation of the communication device 200. The address or addresses of the communication device 200 are preferably stored in EEPROM. The information received from the BTSs 104, 105, including the list of product providers and the instructions for displaying the list, is preferably stored in RAM.

The processor 205 is preferably programmed to alert the user of the communication device 200 of the device's receipt and storage of information, such as a list of product providers, by way of the alerting device 211. The alerting device 211 preferably uses a conventional vibration or audible alerting mechanism. Once the user has been alerted, the user can invoke functions accessible through the user input device 213 to perceive the stored information and respond to it as necessary. The user input device 213 preferably comprises one or more of various known input devices, such as a keypad, a computer mouse, a touchpad, a touchscreen, a trackball, and a keyboard.

Responsive to signaling from the user input device 213, in accordance with instructions stored in memory 207, or automatically upon receipt of certain information from the receiver 203, the processor 205 directs the stored information or received information, as applicable, to the display 209. The display 209 presents the selected information to the user by way of a conventional liquid crystal display (LCD) or other visual display, or alternatively by way of a conventional audible device (e.g., speaker) for playing out audible messages. In addition, the processor 205 may instruct the display 209 to automatically present the user of the communication device 200 with at least a visual indication (e.g., an icon or an icon in combination with a periodic chime) that informs the user that newly received information is stored in the memory device 207. The communication device 200 of FIG. 2 is preferably used to implement all of the wireless communication devices 101, 102 in the system 100.

Referring to both FIGS. 1 and 2, operation of the communication system 100 occurs substantially as follows in accordance with the present invention. In a preferred embodiment, when a user of a communication device (e.g., device 101) desires information about a product, such as a good or a service, the user enters a request for the product into the communication device 101 via the user input device 213. The request preferably indicates a product type. The specificity of the product type depends on the desires of the communication device user. For example, the device user may specify the product type very generally (e.g., automotive), very specifically (e.g., computer network consulting services), or with any specificity in between.

The communication device 101 then transmits the request over an appropriate communication resource 126 to the BTS 104 serving the geographic area containing the communication device 101. The BTS 104 processes the received request in accordance with known techniques and forwards the request to the wireless system controller 107, which in turn, forwards the request to the context engine server 109. Upon receiving the request, the context engine server 109, employing pre-stored software algorithms, determines the approximate location of the communication device 101, for example, by requesting and receiving such location from the wireless system controller 107. Responsive to receiving a location request from the context engine server 109, the wireless system controller 107 determines the approximate location of the communication device 101 in accordance with known techniques, such as by requesting such location from the communication device 101 itself (e.g., when the communication device 101 includes a GPS receiver 221 and appropriate software in the device's memory 207 to determine the device's location responsive to receipt of GPS signals), by using known triangulation methods, or by examining its own database to determine which BTS 104 is currently serving the communication device 101 and, therefore, which BTS coverage area the device 101 is likely in.

Having determined the communication device's approximate location, the context engine server 109 proceeds with attempting to obtain the requested product information. First, the context engine server 109 examines a relational database containing product provider information that is preferably stored within the context engine server 109, but that may alternatively be stored in a database that is external to the context engine server 109 and coupled to the context engine server 109 via an appropriate communication link. The goal of such examination is to determine whether the requested product is available near the present location of the communication device 101. For the purposes of the present invention, a product provider may be a manufacturer, wholesaler, retailer, or distributor of the particular product (i.e., any person or entity in the distribution chain of the product).

The provider information stored in the context engine server's relational database is preferably provided by the product providers themselves upon signing up for service with the communication system operator or operator of the context engine server 109. Accordingly, the provider information can be stored in the context engine server's database at any time, although information on a particular quantity of providers is likely necessary prior to initial incorporation of the context engine server 109 into the communication system 100. In addition, product providers that are already being served by the context engine server 109 may, at any time, update their provider information as necessary, preferably through electronic communication with the context engine server 109 over link 122 (e.g., via the Internet).

The context engine server's relational database relates the identities of the product providers with various categories of products. In addition, the database may relate product providers with their locations and hours of operation. Further, the database includes contact information for the providers, such as the Internet Protocol (IP) addresses of the servers 120 that contain the websites of the product providers and/or the domain names of the product provider websites themselves.

Depending on a variety of factors, such as the processing power of the context engine server 109, the size of the context engine server's database, the product provider's desire to control updates to its product information, and/or the product provider's desire to incorporate bidding logic into its server 120, the degree to which the product providers are related to their products in the context engine server's database varies. For example, when a small context engine server database is employed or the product provider desires to maintain control of product information updates, the products may be generally classified into large categories, such as food, automotive, clothing, recreation, accounting services, legal services, medical services, and so forth, and the operating locations of the product providers may be generally classified by state or region of the country. By contrast, when a larger database is available or the product provider allows the context engine server to update its product information in response to input from the provider's server 120, the products may be more particularly classified (e.g., Chinese food, art museum, or pediatric dental services) and the operating locations may be specified with particularity in the database.

Having examined the relational database for possible product providers in view of the approximate location of the communication device. 101, the context engine server 109 selects providers that provide the type of product requested and that are located in a general vicinity of the communication device (e.g., are located in the same city as the communication device or in the same region of the country as the communication device). The context engine server 109 conveys at least a product information request to the selected product provider servers 120 via communication link 122 (preferably the Internet). In addition to a product information request, the context engine server 109 may also convey specific information about the communication device user or general demographic information of the device user to the selected product providers 120 if the operator of the context engine server 109 had previously solicited such information from the device user (e.g., via a survey) or the wireless subsystem operator and the device user had given the operator of the context engine server 109 authorization to provide such information to the product providers 120. Such additional consumer information enables the product providers 120 to determine the likelihood that the device user will actually purchase or otherwise obtain (e.g., free of charge if so offered) their products and, therefore, whether or not to expect a financial return or other benefit from the costs of advertising their products to the device user.

The product providers 120 respond to the product information request by sending responses back to the context engine server 109 via communication link 122 (again preferably over the Internet). The responses preferably include offers to pay advertising fees and may also include certain terms associated with the particular offers. For example, a provider may require that it be exclusively identified to the communication device user, that it be exclusively identified to the device user for a certain period of time (e.g., ten seconds), that it be listed first in a list of product providers, or that its identity be enhanced in some specified manner (e.g., be accompanied by its trademark, service mark, slogan, or jingle, be illuminated or put in a certain color, be accompanied by an icon, be accompanied by directions from the device user's location to the location of the product provider, or be highlighted using any other technique for emphasizing the provider's identity). The responses may further include specific locations of the providers or at least locations at which the communication device user may obtain the desired product (e.g., locations of retailers of the product provided by responding manufacturers or distributors if such retailers were not sent a product information request or are not stored in the context engine server database), especially when such specific location information is not stored in the context engine server's database. The advertising fees may be offered and paid on a per advertisement basis, pursuant to a periodic (e.g., yearly) subscription, or in any other manner negotiated between the product providers and the context engine server or system operator.

Subsequent to receiving at least some of the responses (e.g., after a predetermined time-out period from the time of transmission of the product information request), the context engine server 109 generates a list of product providers based on the offered advertising fees, when so offered, and optionally on the provider-required terms. Alternatively, when no such advertising fees have been offered, the context engine server 109 generates a list of product providers based on other ranking factors, such as the proximity of the providers to the communication device, alphabetical order, user preferences, relatedness of the product to the product request, and/or any other factor that may be used to prioritize or rank the list of product providers. In addition to generating a list of product providers, the context engine server 109 preferably generates a set of instructions for instructing the communication device 101 how to display the list of product providers to the communication device user.

In a preferred embodiment, the context engine server 109 considers the advertising offers or bids mutually exclusively (i.e., on a provider-by-provider basis) in generating the provider list. In an alternative embodiment, the context engine server 109 may consider additive offers from multiple providers. For example, a product manufacturer may make one offer and a retailer of the manufacturer's product may make another offer, wherein the offer from the manufacturer indicates that it is to be added to any offers from retailers of the manufacturer's product. In this case, the retailer's offer is considered to be the sum of the retailer's and manufacturer's offers for the purposes of positioning the retailer in the list of providers.

The context engine server 109 provides the list of providers and the instructions for displaying the list to the communication device 101 as a data message via the wireless system controller 107, BTS 104, and communication resource 124. Upon receiving the data message, the communication device 101 processes the message in accordance with known receiving techniques and stores the list and instructions in memory 207. The communication device processor 205 then instructs the device display 209 to display the stored list of providers and their associated enhancements or advertisements, if any, to the device user in accordance with the instructions. The display of the provider identities and their associated enhancements or advertisements may be visual, audible, or an audiovisual combination depending on the particular display 209 employed by the communication device 200.

In an alternative embodiment, the context engine server 109 may provide a list of product providers and/or advertisements for products to the communication device 101 without first receiving a request for a product from the communication device 101. In this embodiment, the context engine server 109 might periodically request and receive the approximate location of the communication device 101 from the wireless system controller 107 and automatically generate the product information requests based on the device's current location or change in location, and/or the time of day. Receipt of responses from the product providers 120, generation of the provider list and display instructions, and provision of the list and instructions to the communication device 101 would then occur as described above.

Although the present invention was described above primarily with respect to providing product information to wireless device users, the present invention is also readily applicable to providing such information to wireline device users, provided that the wireline device includes a receiver, a transmitter (when two-way operation is desired), a processor, memory, a display, and a user input device. When coupled with a wireline or cable modem, most, if not all, the wireline devices listed above with respect to FIG. 1 include the necessary components to implement the present invention. In such a case, all requests for product information are conveyed from the wireline device 103 to the PSTN/Service Provider 111 and then to the context engine server 109. Analogously, the provider list and instructions for displaying it are conveyed from the context engine server 109 to the PSTN/Service Provider 111, and then to the wireline device 103.

As described above, the present invention provides a means through which communication device users at various locations can obtain information on desired products available in a general vicinity of their locations through real-time advertisements of providers of the products. Unlike television commercials or Internet banner advertisements which are directed at consumers generally in the hope that such advertisements will create a desire to purchase the advertisers products, the present invention is directed to advertising to consumers on an individual basis at times when the consumers actually or very likely desire to obtain the advertiser's product or products. In addition, the present invention aids consumers in locating products they may need, especially when the consumer is searching for a particular product in an unfamiliar area.

Figure 3:
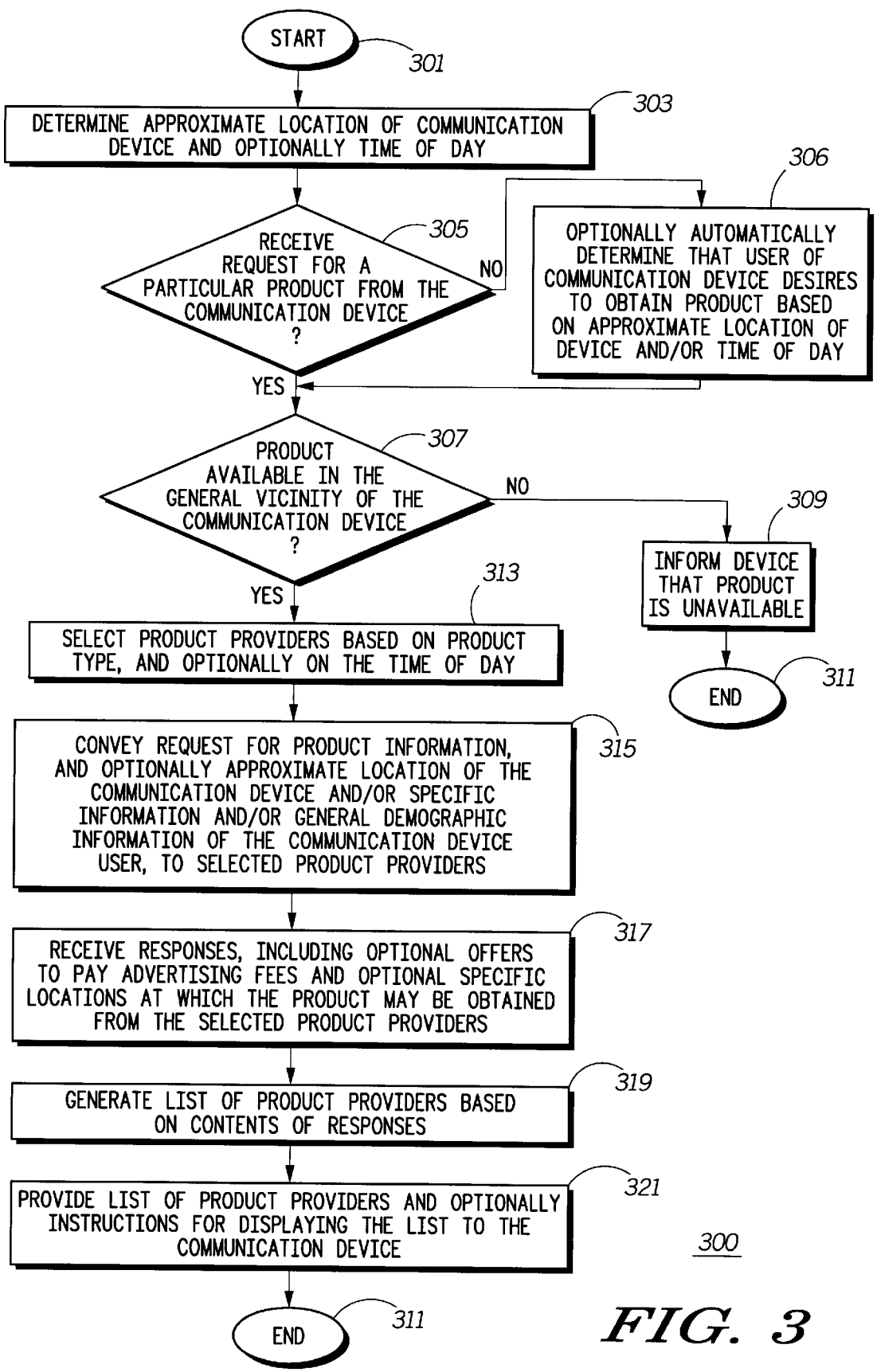
FIG. 3 is a logic flow diagram of steps executed by a context engine server to inform a user of a communication device where to obtain a product in accordance with the present invention.

FIG. 3 is a logic flow diagram 300 of steps executed by a context engine server to inform a user of a communication device where to obtain a product in accordance with the present invention. The logic flow begins (301) when the context engine server determines (303) an approximate location of the communication device and optionally the time of day. The approximate location of the communication device is preferably obtained from a wireless system controller in the event that the communication device is a wireless device or from the PSTN provider (e.g., telephone company) or Internet Service Provider in the event that the communication device is a wireline device. The approximate location of the communication device may be determined repeatedly (e.g., periodically when the communication device is a wireless device) or only once (e.g., some time during a communication when the communication device is a wireline device).

In addition to determining the approximate location of the communication device and the time of day, the context engine server determines (305) whether it had received a request for a particular product from the communication device. That is, the context engine server determines whether it received a product request from the communication device either before or after determining the communication device's approximate location.

In the event that the context engine server did not receive a product request from the communication device, the context server may optionally automatically determine (306) that the user of the communication device desires to obtain a product based on the approximate location of the device (e.g., the device user may want to purchase bait when near a lake) and/or the time of day (e.g., the device user may want to purchase lunch around noon). That is, the context engine server may automatically determine that the communication device user desires to receive advertisements for certain products based on the time of day and/or the device's current location even in the absence of a specific request for such products by the communication device. Alternatively, the context engine server may automatically determine that the communication device user generally desires to obtain a product based on the device's current location and/or the time of day and thereby permit the product providers to select which products to bid for advertising to the device user, instead of requiring the vendors to respond to a particular anticipated need of the user. Such an alternative embodiment may be implemented by allowing the product providers to store their general desire to advertise in a particular geographic area(s) and/or during a particular time(s) of the day in the context engine server's relational database, instead of storing their actual products or categories of products in the database as described above.

In the event that the context engine server either expressly received a product request from the communication device or automatically determined the device user's desire to obtain a product in the absence of an express product request, the context engine server determines (307) whether the requested or hypothetically desired product is available in the general vicinity of the communication device. To determine whether a product is available, the context engine server queries its relational database of product providers, product categories, hours of operation, and operating locations or areas to determine whether at least one provider of the requested or hypothetically desired product or product type operates in the general vicinity of the communication device's current approximate location. For example, if the communication device conveyed an express request at midnight for fast food and was approximately located in Dallas, Tex., the context engine server might search its database to determine whether the database included any fast food restaurants or fast food chains operating in the Dallas-Fort Worth area that were open at midnight or all night.

The distance from the approximate location of the communication device that defines the general vicinity of the communication device depends on a variety of factors, such as the processing and database capabilities of the context engine server and/or the desire of the product providers to control, in real-time, the product information (e.g., product offerings and locations) provided to the communication device user. For example, for a context engine server with low processing power and/or memory or when the provider wants to maintain real-time control of its product information, the context engine server might store product providers in very general categories and include only the states or regions of the country in which the product providers operate. In this case, the general vicinity of the communication device might be the state or the region of the country (e.g., northwest, southwest, midwest, northeast, southeast, south, north, and so forth) in which the device is located. On the other hand, for a high processing power context engine server having stored therein specific product categories and product provider locations, the general vicinity of the communication device might comprise a one kilometer radius from the location of the communication device when the desired product is within such a one-kilometer radius. In the preferred embodiment, the general vicinity of the communication device comprises a radial distance of not more than one hundred kilometers (sixty miles) from the approximate location of the communication device. That is, the preferred general vicinity of the communication device is the distance that is a one hour or less drive from the approximate location of the communication device. Alternatively, the general vicinity of the communication device might comprise a broader area, such as a region of the country, a state, or a county in which the communication device is currently located or a projected travel path of the communication device (e.g., when the communication device includes or is coupled to a vehicle's navigation system).

In the event that the product is not available in the general vicinity of the communication device and the communication device has expressly requested the product, the context engine server informs (309) the communication device that the product is unavailable and the logic flow ends (311). Product availability information (or unavailability information as the case may be) may be logged or stored by the context engine server and provided, at a later time, to the product providers to enable the providers to determine whether they should offer their products in a particular geographic area. In the event that the product is available in the general vicinity of the communication device, the context engine server selects (313) product providers based on the type of product requested by, or expected to be of interest to, the communication device user and optionally on the time of day. For example, if in the above example, there are 300 fast food restaurants in the Dallas-Fort Worth area, but only 50 of them are open at midnight or all night, then the context engine preferably selects the 50 restaurants that are open at midnight or all night. Alternatively (e.g., when the context engine server does not store hours of operation in its database), the context engine server might select all 300 fast food restaurants as the selected providers. However, in the event that many of the restaurants are franchises of large fast food chains (e.g., twenty of the restaurants are "MCDONALD'S", twenty are "BURGER KING", twenty are "WENDY'S", twenty are "SUBWAY", and so forth), the context engine server may only need to select the large franchiser (e.g., McDonald's Corporation) as the product provider for each group of franchises. In such a case, the franchisor or its server would inform the context engine server as to which restaurants are in the general vicinity of the communication device. Still further, when the context engine server includes high processing power and memory capabilities, the context engine server may include the locations of all 300 fast food restaurants in the Dallas-Fort Worth area in its database. In such as case, the context engine server may select only those restaurants that are within a five or ten kilometer (three or six mile) radius of the current approximate location of the communication device as the selected product providers.

After selecting the product providers, the context engine server conveys (315) a request for product information to the selected product providers. For example, the context engine server might send the request to the Internet server or servers for the product providers. The request preferably indicates that a consumer has requested information about the provider's product or that a consumer is currently likely to be in need of the provider's product.

In addition to conveying a request for product information, the context engine server might optionally convey the approximate location of the communication device (e.g., when the context engine server itself does not store the actual locations of the product providers), specific information about the communication device user (e.g., particular food choices, musical tastes, favorite fast food chains, loyalty program memberships, and so forth), and/or general demographic information related to a group of persons of which the communication device user is a member (e.g., height range, weight range, household income range, ethnicity, occupation, and so forth). In order to convey the latter two types of information to the product providers, such information is preferably conveyed to the context engine server from the communication device user either at the time the user registered for communication service or in conjunction with the request for the product. Alternatively, the user-specific information and/or general demographic information may be automatically determined by the context engine server based on the behavior of the user, such as the user's travel patterns, the types of products most often requested, and so forth.

Some time after conveying the product information request and optionally other information to the selected product providers, the context engine server receives (317) responses to the request from at least some, and preferably all, of the product providers. At least some of the responses preferably include offers to pay advertising fees to the operator of the communication system and/or the operator of the context engine server. In addition, the responses may include certain terms upon which the advertising fees are based, such as being the exclusive provider identified to the consumer, being the first provider in a list of providers identified to the consumer, or requiring certain enhancements to be made to the provider's identification, such as including the provider's jingle, slogan, or other trademark or service mark, highlighting the provider's name, using a particular color for the provider's name, and so forth. Thus, the requests for product information serve also as opportunities for real-time advertising to consumers that are currently actually or highly likely in need of a product or products of the type provided by the selected product providers. The responses may optionally include specific locations at which the desired product or products may be obtained from the product providers (e.g., when such specific locations are not stored in the context engine server's database). The responses to requests made over the Internet are preferably received over the Internet. With the increased popularity of the Internet, the Internet is the preferred medium over which the context engine server communicates with the product providers and their respective servers.

After receiving the responses, advertising fee offers, and/or provider locations, the context engine server generates (319) a list of product providers based on the contents of the responses. For example, the highest bidder may be first on the list or may be the only provider on the list in accordance with the provider's required terms and/or the context engine server's operating policies. In addition, the list may include all the product providers that responded or only a subset of the responding providers (e.g., the top ten bidders).

The context engine server then provides (321) the list of providers and optionally instructions for displaying the list to the communication device, and the logic flow ends (311). When provided, the instructions include the priorities and mechanics for displaying the identities and other information pertaining to the providers on the list. As described above, the priorities for displaying the provider identities are based in large part on the advertising fees offered to be paid by the responding product providers when at least some of the providers make such advertising fee offers.

Figure 4:
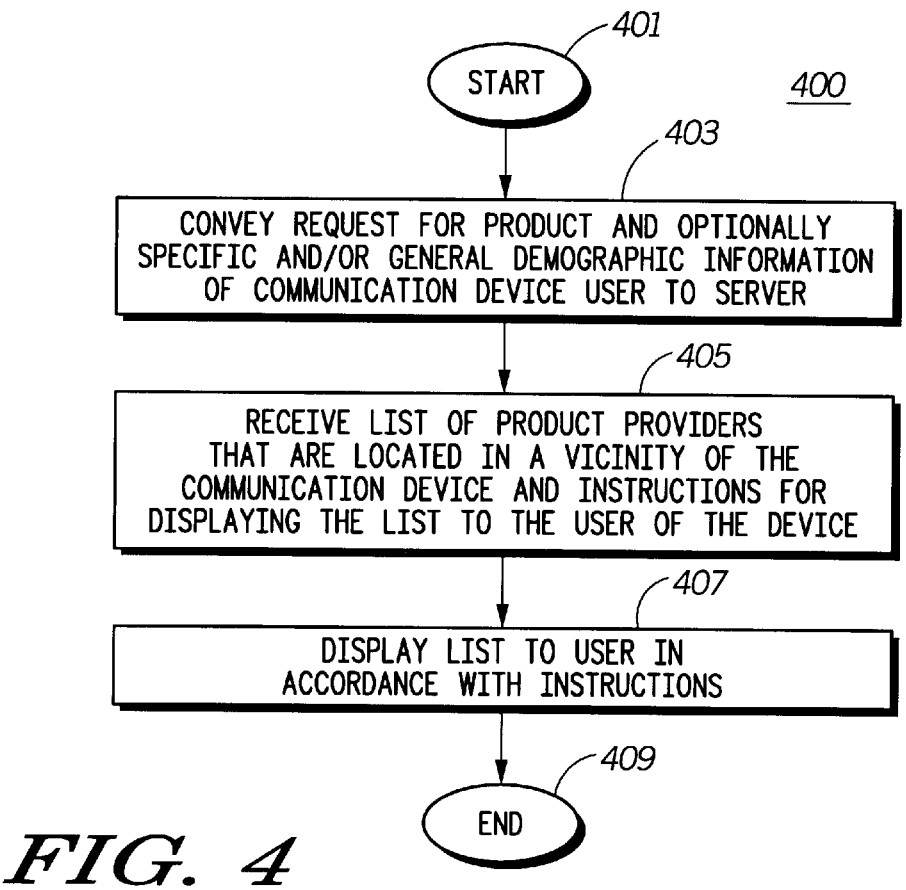
FIG. 4 is a logic flow diagram of steps executed by a communication device to inform a user of the communication device where to obtain a product in accordance with a preferred embodiment of the present invention.

FIG. 4 is a logic flow diagram 400 of steps executed by a communication device to inform a user of the communication device where to obtain a product in accordance with a preferred embodiment of the present invention. The logic flow begins (401) when the communication device conveys (403) a request for a particular product (e.g., Italian food) to the communication system infrastructure. The form of conveyance depends on the type of communication device. For example, a wireless communication device of the type depicted in FIG. 2 transmits the request to a BTS over a wireless communication channel. The BTS then forwards the request to a system controller (e.g., central controller, base site controller, paging controller, or the like) via a communication link, such as a T1 link. The system controller then forwards the request to a context engine server via another communication link, such as the Internet, as described above. Alternatively, a wireline device, such as a personal computer coupled to a modem, may transmit the request to the content engine server via the PSTN or an Internet Service Provider. As described above, this request is processed in accordance with known wireline or wireless techniques, depending on the type of communication device that sent it, and is forwarded to a context engine server of the system infrastructure. The context engine server then seeks competitive bids for advertising the requested product from product providers that themselves are located in, or may have retailers, distributors, or wholesalers located in, a general vicinity of the communication device.

In addition to the product request, the communication device might optionally convey (403) specific information related to a user of the communication device, such as personal preferences explicitly input into the communication device by the user or implicitly determined by the communication device based on the behavior of the user (e.g., often-requested products (when the communication device is programmed to detect and store such requests) or travel patterns (e.g., when the communication device is programmed to track and periodically store the location of the device)), and/or general demographic information, such as ethnicity, gender, age, household income, and so forth, related to a group of persons that includes the communication device user. The optional information is provided to the context engine server for storage and, if authorized by the communication device user (e.g., in conjunction with sending the optional information), may be provided to the product providers. The product providers may then use the optional information in a variety of ways, such as to establish advertising bid prices, product price offers, product incentives, and/or offers to extend credit to the device user.

Some time after conveying the product request and, if so conveyed, the optional information, the communication device receives (405) a list of product providers that are located in a vicinity of the communication device and instructions for displaying the list of providers to the communication device user. The instructions preferably include priorities for displaying the identities of the listed providers. For example, the instructions may indicate that the identities of the providers should be displayed in a particular order (when the list includes more than one provider), for particular lengths of time, and/or with particular enhancements. Such enhancements may include highlighting (e.g., illuminating, bolding, underlining, and/or displaying in color) the name and/or location of the provider, playing an audible jingle indicative of the provider, displaying a trademark or service mark of the provider, using a particular font size, and/or using any other audible or visual enhancement technique depending on the implementation of the device's display.

The content of the instructions is provided by the content engine server based on the offers or bids for advertising fees and/or display requirements received from the providers. For example, as discussed above, the provider offering to pay the highest advertising fee may require its identity to be displayed exclusively, as the first identity in the list, as the only identity displayed on the communication device display for a predetermined period of time (e.g., ten seconds), and/or together with enhancements. Providers offering less or no advertising fees may then be displayed in descending order of offer or only the providers offering advertising bids at or above a defined threshold may be displayed. It will be appreciated by those of ordinary skill in the art that numerous possibilities exist for instructing the communication device to display the list of providers based on the offered advertising fees and/or other factors (e.g., when no advertising fees have been offered), such as the geographic proximity of the providers to the communication device. The present invention encompasses all such possibilities provided that such instructions are consistent with the operating policies of the context engine server operator and are based on the offered advertising fees, the display requirements of the providers, and/or any other ranking factors, such as the proximity of the providers to the communication device, alphabetical order, user preferences, relatedness of the product to the product request, and/or any other factor that may be used to prioritize or rank the list of product providers.

After receiving the list of providers and the display instructions from the communication system infrastructure, the communication device displays (407) the list of providers to the communication device user in accordance with the received instructions, and the logic flow ends (409).

Figure 5:
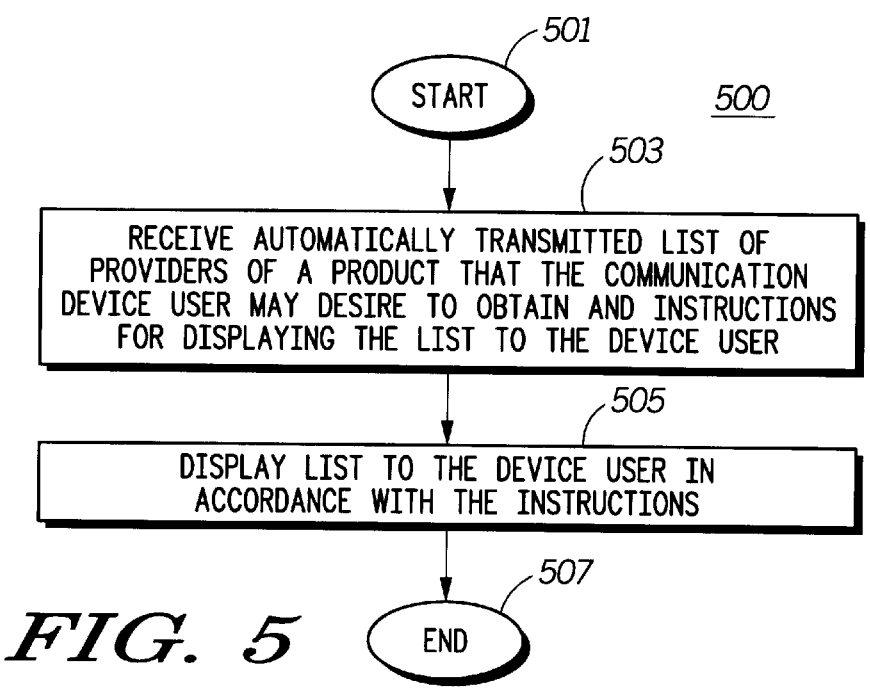
FIG. 5 is a logic flow diagram of steps executed by a communication device to inform a user of the communication device where to obtain a product in accordance with an alternative embodiment of the present invention.

FIG. 5 is a logic flow diagram 500 of steps executed by a communication device to inform a user of the communication device where to obtain a product in accordance with an alternative embodiment of the present invention. The logic flow begins (501) when the communication device receives (503) a list of providers of a product, such as a good or a service, that the communication device user may desire to obtain and instructions for displaying the list to the device user. In this embodiment, the received list is a list that was automatically generated and transmitted by the context engine server based at least on the communication device's approximate location as determined by the communication system infrastructure. In contrast to the embodiment described above with respect to FIG. 4, the list of providers in this embodiment is not received in response to any formal request for a product by the communication device. For example, in accordance with known techniques, the system controller of a wireless system may periodically determine the locations of communication devices that are registered in the system. Upon determining such locations, the system controller forwards the locations to the context engine server which, upon receiving such locations, may automatically query providers of certain products, such as gasoline or food, that wireless device users are likely to be in need of and automatically generate a list of providers for conveyance to one or more of the communication devices. Thus, in this embodiment, the context engine server anticipates the communication device user's need for a product and provides the communication device with product information (advertisements) pertaining the potentially needed product.

The list of product providers may also be based on the time of day that the list was transmitted. For example, a wireless communication device user registered with the wireless system between the hours of 5:30 PM and 7:30 PM may be in need of dinner. Accordingly, the context engine server, upon receiving communication device locations from a system controller, may automatically query servers of restaurants, generate a list of restaurants that are open for dinner after receiving responses to the queries, and convey the list to one or more of the communication devices via the system controller and a BTS or BTSs.

After receiving the list of providers and the display instructions from the context engine server, the communication device displays (505) the list in accordance with the instructions, and the logic flow ends (507). As discussed above with respect to FIG. 4, the instructions preferably include priorities for displaying the identities of the listed providers, wherein the priorities are based on the offers or bids for advertising fees received from the providers by the context engine server.

The present invention encompasses a method for informing a user of a communication device where to obtain a product and a communication system employing such a method. With this invention, communication device users (both wireline and wireless) can obtain information for desired products at the time they need such information as opposed to at other times, such as when surfing the Internet or watching television, when the information is not in need. In addition, system operators can provide such a product information service by collecting advertising fees from the product providers. Further, through its use of the Internet as the communication backbone between the context engine server and the product providers, the present invention enables product providers to make real-time competitive bids for product advertising at the time when the providers know that consumers are actually interested in the provider's products or are likely to be interested in the provider's products, thereby increasing the efficiency of money spent on advertising.

While the foregoing constitute certain preferred and alternative embodiments of the present invention, it is to be understood that the invention is not limited thereto and that in light of the present disclosure, various other embodiments will be apparent to persons skilled in the art. Accordingly, it is to be recognized that changes can be made without departing from the scope of the invention as particularly pointed out and distinctly claimed in the appended claims which shall be construed to encompass all legal equivalents thereof.

What is claimed is:

1. A method for informing a user of a communication device where to obtain a product, the method comprising the steps of:

determining an approximate location of the communication device;

determining whether the product is available in a vicinity of the communication device based on the approximate location of the communication device;

conveying a request for product information to a plurality of product providers when the product is available in the vicinity of the communication device;

receiving a plurality of responses to the request for product information from at least some of the plurality of product providers; and providing a list of product providers to the communication device based at least on the plurality of responses.

2. The method of claim 1, wherein the product comprises at least one of a good and a service.

3. The method of claim 1, further comprising the step of:

prior to the step of determining an approximate location of the communication device, receiving a request from the communication device for the product, the request for the product indicating a product type.

4. The method of claim 3, further comprising the step of selecting the plurality of product providers based on the product type.

5. The method of claim 4, further comprising the step of determining a time of day and wherein the step of selecting comprises the step of selecting the plurality of product providers based on the time of day and the product type.

6. The method of claim 1, further comprising the step of:

after determining the approximate location of the communication device, automatically determining that the user of the communication device desires to obtain the product based on the approximate location of the communication device.

7. The method of claim 6, further comprising the step of determining a time of day and wherein the step of automatically determining comprises the step of automatically determining that the user of the communication device desires to obtain the product based on the approximate location of the communication device and the time of day.

8. The method of claim 1, wherein the step of conveying the request for product information further comprises the step of conveying at least one of specific information related to the user of the communication device and general demographic information related to a group of persons that includes the user of the communication device to the plurality of product providers.

9. The method of claim 1, wherein the step of conveying the request for product information further comprises the step of conveying the approximate location of the communication device to the plurality of product providers and wherein the plurality of responses include specific locations at which the product may be obtained.

10. The method of claim 1, further comprising the step of, prior to the step of conveying a request for product information, determining locations of at least the plurality of product providers to produce determined locations, and wherein the step of conveying the request for product information comprises the step of conveying the request for product information to the plurality of product providers based the determined locations.

11. The method of claim 1, wherein the step of providing a list of product providers to the communication device further comprises the step of providing instructions for displaying the list to the user of the communication device, wherein the instructions include priorities for displaying at least identities of the product providers in the list.

12. The method of claim 1, wherein a vicinity of the communication device comprises a radial distance of not more than one hundred kilometers from the approximate location of the communication device.

13. The method of claim 1, wherein the step of conveying a request for product information comprises the step of conveying the request via the Internet.

14. The method of claim 1, wherein the step of receiving a plurality of responses to the request for product information comprises the step of receiving the plurality of responses via the Internet.

15. The method of claim 1, wherein at least some of the plurality of responses include offers to pay respective advertising fees and wherein the step of providing a list of product providers to the communication device comprises the step of providing a list of product providers to the communication device based on the advertising fees offered to be paid.

16. The method of claim 15, wherein the step of providing a list of product providers to the communication device further comprises the step of providing instructions for displaying the list to the user of the communication device, wherein the instructions include priorities for displaying at least identities of the product providers in the list and wherein the priorities are based on the advertising fees offered to be paid.

17. A method for a communication device to inform a user of the communication device where to obtain a product desired by the user, the method comprising the steps of:
    conveying a request for the product to a server;
    responsive to the request, receiving a list of product providers that are located in a vicinity of the communication device and instructions for displaying the list of product providers to the user of the communication device, wherein the instructions include priorities for displaying at least identities of the product providers in the list and wherein the priorities are based on advertising fees offered to be paid by at least some of the product providers; and
    displaying the list of product providers to the user of the communication device in accordance with the instructions.

18. The method of claim 17, wherein the step of conveying a request for the product further comprises the step of conveying at least one of specific information related to the user of the communication device and general demographic information related to a group of persons that includes the user of the communication device to the server.

19. The method of claim 17, wherein the product comprises at least one of a good and a service.

20. A method for a communication device to inform a user of the communication device where to obtain a product, the method comprising the steps of:
    receiving an automatically transmitted list of product providers that are located in a vicinity of the communication device and instructions for displaying the list of product providers to the user of the communication device, wherein the instructions include priorities for displaying at least identities of the product providers in the list; and
    displaying the list of product providers to the user of the communication device in accordance with the instructions.

21. The method of claim 20, wherein the product comprises at least one of a good and a service.

22. The method of claim 20, wherein the priorities for displaying at least the identities of the product providers are based on advertising fees offered to be paid by at least some of the product providers.

23. A communication system in communication with a plurality of provider servers associated with respective product providers, the communication system comprising:
    at least one base site for providing communication services to a plurality of communication devices;
    a system controller, coupled to the at least one base site, for controlling the communication services provided by the at least one base site and for determining an approximate location of at least one communication device of the plurality of communication devices; and
    a context engine server, coupled to the system controller and the plurality of provider servers, for receiving at least the approximate location of the at least one communication device, for requesting product information for a product from at least some of the plurality of provider servers based on the approximate location of the at least one communication device, for receiving the product information and an offer to pay respective advertising fees from the at least some of the plurality of provider servers, for generating a list of product providers that offer the product based on the advertising fees offered to be paid, and for providing :the list of product providers to the system controller for subsequent delivery to the at least one communication device.

* * * * *